United States Patent [19]

Ellinger

[11] 4,123,081
[45] Oct. 31, 1978

[54] BEET HARVESTER HITCH

[75] Inventor: Earl H. Ellinger, Crookston, Minn.

[73] Assignee: Dee, Inc., Crookston, Minn.

[21] Appl. No.: 817,928

[22] Filed: Jul. 22, 1977

[51] Int. Cl.² .............................................. B60D 1/14
[52] U.S. Cl. .................................................... 280/463
[58] Field of Search ............... 280/462, 463, 464, 465, 280/466, 467, 468; 56/1, 377, 228; 171/58; 172/324, 327, 328, 679

[56] References Cited

U.S. PATENT DOCUMENTS

| 839,518 | 12/1906 | Shaw | 280/465 |
|---|---|---|---|
| 3,893,283 | 7/1975 | Dandl | 280/463 |

*Primary Examiner*—Joseph F. Peters, Jr.
*Assistant Examiner*—R. Schrecengost
*Attorney, Agent, or Firm*—H. Dale Palmatier

[57] ABSTRACT

A hitch for a beet harvester including a hitch frame traversing the entire width of the harvester with outer ends connected to the harvester frame, a transverse beam with obliquely forwardly extending side portions affixed together at an apex located intermediate the ends of the hitch frame, a hitch bar extending forwardly from the apex of the transverse beam and being pivotally connected to the hitch frame adjacent said apex, the front end of the hitch bar being adapted for connection to the drawbar of a tractor, and a steering cylinder pivotally connected to the hitch bar well rearwardly of the apex of the transverse beam and also pivotally connected to one side portion of the transverse beam.

2 Claims, 2 Drawing Figures

BEET HARVESTER HITCH

This invention relates to a hitch by which a sugar beet harvester is attached to a tractor and steered transversely relative to the tractor.

Background of the Invention

Beet harvesters are generally constructed with a frame wide enough to span four or more rows of beets, and a large tractor, oftentimes with dual wheels, is used to draw the harvester through the field. The harvester has a set of beet lifter wheels at each of the rows which is spanned for engaging and lifting the beets out of the ground. Initial cleaning is done in the harvester and then the beets are elevated and off-loaded onto a truck or wagon adjacent the harvester.

The hitch by which the harvester is attached to the tractor typically is constructed of heavy gauge rectangular steel tubing, and the hitch typically projects forwardly from the outer sides of the frame adjacent the lifter wheels and the hitch includes a transverse member which spans across the space in front of the lifter wheels; and a hitch and a hitch bar also extends forwardly from the transverse member for attachment to the drawbar of the tractor. The rectangular frame-like construction of the hitch projecting forwardly form the harvester frame often interferes with the wheels of the tractor when the tractor and harvester are turned short as at the end of a field or in a corner of the field. The hitch bar is usually pivoted to the hitch frame, and a forwardly located hydraulic cylinder controls the angle between the hitch bar and the hitch frame for the purpose of controlling the steering of the harvester to assure that the lifter wheels travel precisely along the row of beets for efficiently lifting the beets without damaging them. The hydraulic cylinder which is located forwardly of the hitch frame, oftentimes interferes with the tractor wheels, particularly when only a single wheel is used at the rear of the tractor and when the tractor is turned short to make a tight turn as at the end of a field or in a corner of the field.

Summary of the Invention

The present invention relates to a modified hitch by which the harvester is connected to and drawn by a tractor and which allows the tractor to turn sharply without causing the rear tractor wheels to interfere with the hitch frame and with the steering cylinder by which the orientation of the hitch bar is controlled relative to the hitch frame to accomplish transverse steering of the harvester as it travels along the beet rows.

The hitch frame utilizes a pair of front members which are obliquely oriented so as to converge upon each other in a forward direction to an apex where such members are affixed to each other, and the outer and rear portions of these frame members are located immediately adjacent the forwardmost portion of the harvester frame.

The hitch bar projects forwardly from the apex of the hitch frame, but the hitch bar also extends rearwardly from the apex and is attached to a hydraulic cylinder which is confined within the periphery of the hitch frame so as to avoid interference with the tractor tires.

Detailed Specification

Figure 1:
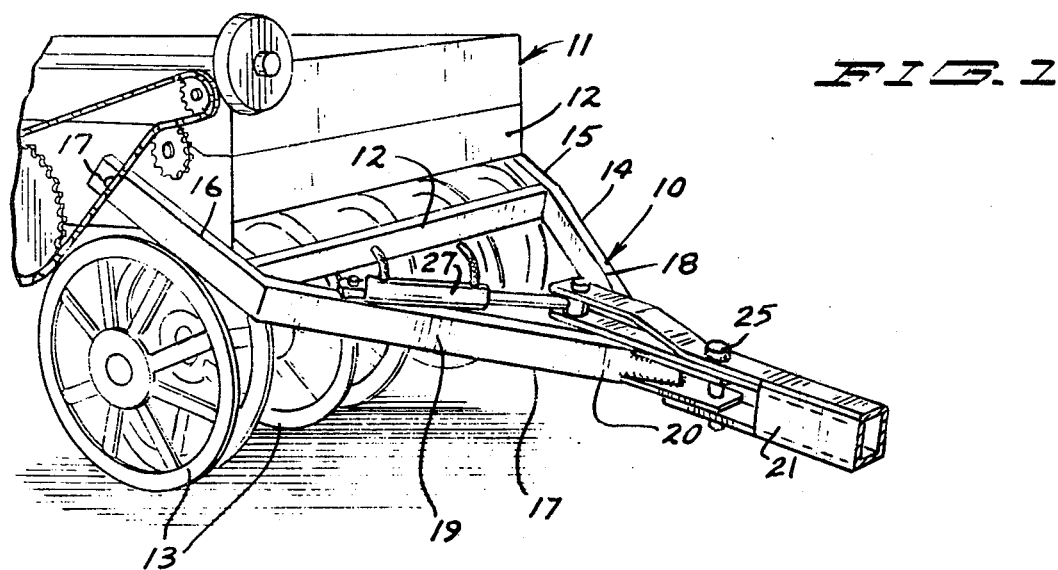
FIG. 1 is a perspective view of the hitch of a beet harvester according to the present invention.
Figure 2:
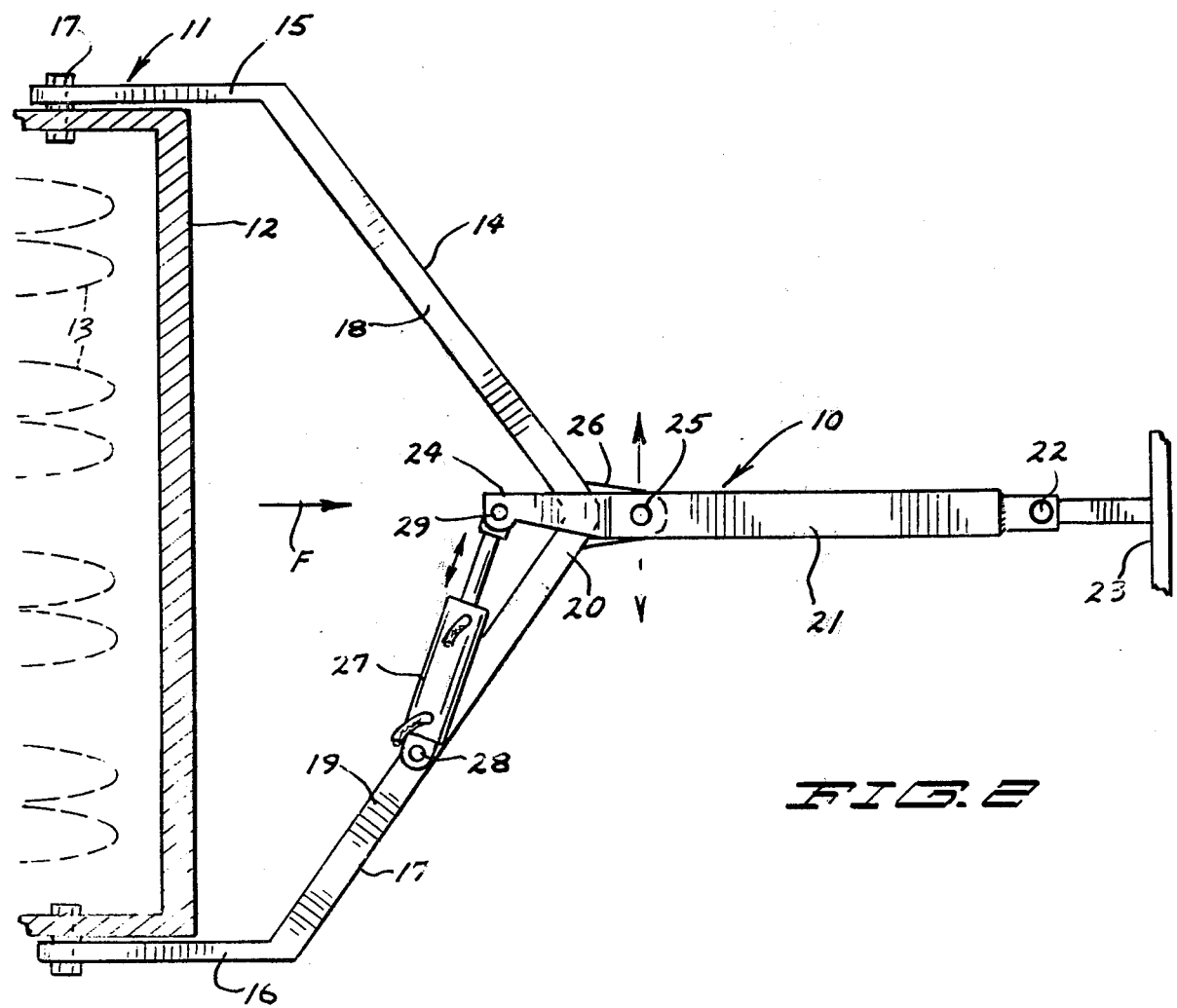
FIG. 2 is a top plan view thereof.

One form of the invention is illustrated in the drawings and is described herein. The hitch is indicated in general by numeral 10 and is particularly adapted for a beet harvester which is indicated in general by numeral 11 and is shown to have a frame 12 and a plurality of beet lifting wheels 13. The harvester 11 is sufficiently wide as to span a number of rows of beets in the field, and in the form illustrated, the harvester 11 will span four rows of beets and simultaneously harvest each row.

After the beets are lifted out of the ground by the lifting wheels 13, the beets are collected and partly cleaned in the harvester 11 and then elevated for the purpose of delivering the beets into a wagon or truck travelling along the side of the harvester.

Sensors for determining the exact location of the rows of beets are used in connection with such a harvester 11 and it is important that the lifting wheels be located directly in alignment with the rows of beets so that the beets can be lifted out of the ground without damage.

The hitch 10 includes a hitch frame 14 which is preferably constructed of heavy gauge steel tubing which is substantially rectangular in cross section. The tubing in the hitch 10 may be approximately four inches by six inches in cross section, or five inches by seven inches in cross section. The hitch frame 14 includes a pair of end members 15 and 16 which extend in a fore and aft direction and which are secured as by pivot pins 17 to the harvester frame.

The hitch frame 14 expands the entire width of the harvester frame and includes a transverse beam 17 which is affixed to and formed integrally with the two rearwardly extending ends 15 and 16. The transverse beam has side portions 18 and 19 which extend obliquely with respect to each other and obliquely forwardly in relation to the direction of travel of the harvester 11 which is indicated by the arrow F. The side portions 18 and 19 of the beam are affixed to each other at an apex 20 which is disposed well ahead of the harvester frame and the lifting wheels. It will be recognized that the side portions 18 and 19 extend obliquely rearwardly into substantially close proximity with the tractor frame at the outside of the outermost lifting wheels.

The hitch 10 also includes a rigid hitch bar 21, also constructed of heavy gauge steel tubing as previously described in connection with the hitch frame 14. The hitch bar has a connecting clevis or other suitable attaching device 22 for attachment to the drawbar 23 of the tractor.

The hitch bar 21 transverses the apex 20 of the transverse beam 17 such that the rear end portion 24 of the hitch bar 21 is disposed well rearwardly of the apex of the beam.

The hitch bar 21 is attached to the transverse beam by a pivot pin 25, preferably closely adjacent the apex of the transverse beam. In the form illustrated, a forward extension portion 26 of the transverse beam is provided, to which the pivot 25 is connected.

A steering cylinder 27 has its rear end connected to one of the side portions 19 of the transverse beam by means of a pivot pin 28, and the extensible rod of the cylinder is connected to the rear end 24 of the hitch beam by means of another pivot 29. The cylinder 27 is thereby pivotally connected to both the transverse beam and the hitch bar so that the beam may produce relative swinging of the hitch bar with respect to the transverse beam. In this way, steering of the harvester 11 relative to the tractor drawbar and relative to the rows of beets in the field is accomplished.

It is particularly important to note that the steering cylinder 27 is disposed wholly rearwardly of the front edge of the transverse beam 19. As a result, there cannot be any interference between the cylinder 27 and the wheels of the tractor when the tractor is turned tightly as when reversing the harvester at the end of a field or when turning in the corner of a field.

Similarly, the oblique orientation of the side portions 18 and 19 of the transverse beam also minimize any likelihood of interference between the transverse beam and dual wheels of a tractor which is used to pull the harvester through the field. The turning of the tractor is unlikely to cause the wheels to engage the transverse beam, primarily because of the shape of the beam. Of course, by minimizing the likelihood of interference between the tractor wheels and the hitch frame and steering cylinder, damage to equipment is minimized and accidents which could cause a tire to be ruined or possibly cause the tractor to tip over are completely minimized.

What is claimed is:

1. A hitch for beet harvesters and the like for attachment to a tractor, comprising
    a hitch frame spanning the width of the harvester and having rearwardly extending outer ends for attachment to the harvester, the hitch frame also having a rigid transverse beam connecting the outer ends together, the beam having side portions extending obliquely of each other and forwardly, and converging on each other at an apex, the side portions of the transverse beam having front faces occasionally engaged by the tractor tires during turning of the tractor,
    a fore and aft extending hitch bar with a front end with a pivot adapted for attachment to the drawbar of such a tractor, the hitch bar traversing the apex of the transverse beam and having a pivot connecting the hitch bar to the transverse beam adjacent the apex thereof for transverse and generally horizontal swinging relative to the hitch frame, the rear end of the bar being disposed significantly behind the apex, and
    a hydraulic steering cylinder extending transversely of the hitch bar and being pivotally connected to one side portion of the beam and to the hitch bar adjacent the rear end thereof, the cylinder being disposed entirely behind the front face of said one side portion of the beam.

2. A beet harvester to be towed by a tractor and having in combination,
    a beet harverster frame, beet handling mechanism including a plurality of pairs of beet lifting wheels to travel along the rows of beets in the field,
    a hitch frame spanning the width of the harvester frame and having rearwardly extending outer ends attached to the harvester frame for drawing the harvester forwardly in the field and steering the harvester from side to side to maintain the lifting wheels in precision relationship with respect to the rows of beets in the field, the hitch frame also having a rigid transverse beam connecting the outer ends together, the beam having side portions extending obliquely of each other and forwardly, and converging on each other at an apex, the side portions of the transverse beam having front faces occasionally engaged by the tractor tires during turning of the tractor,
    a fore and aft extending hitch bar having a front end with a pivot adapted for attachment to the drawbar of such a tractor, the hitch bar traversing the apex of the transverse beam and having a second pivot connection the hitch bar to the transverse beam adjacent the apex thereof for transverse and generally horizontal swinging relative to the hitch frame, the rear end of the bar being disposed significantly behind the apex of the beam, and
    a hydraulic steering cylinder extending transversely of the hitch bar and being pivotally connected to one side portion of the beam and also being pivotally connected to the hitch bar adjacent the rear end thereof, the hydraulic steering cylinder being extensible and retractable to produce limited swinging of the hitch bar with respect ot the transverse beam for steering the lifting wheels with respect to the rows of beets, and the cylinder being disposed entirely behind the front face of said one side portion of the beam to prevent any engagement of the cylinder by the tractor tires during turning of the tractor.

* * * * *